United States Patent [19]

Groves et al.

[11] 4,060,583
[45] Nov. 29, 1977

[54] ELECTRICALLY INSULATING COMPOSITION

[75] Inventors: James D. Groves, Hudson, Wis.; Stefano Loffredo, Naples, Italy

[73] Assignee: Minnesota Mining and Manufacturing Company, Saint Paul, Minn.

[21] Appl. No.: 712,399

[22] Filed: Aug. 6, 1976

Related U.S. Application Data

[63] Continuation of Ser. No. 553,982, Feb. 28, 1975, abandoned.

[51] Int. Cl.$^2$ .......................... H01B 3/30; H01B 3/22; H01B 3/20
[52] U.S. Cl. .......................... 264/272; 174/17 LF; 174/19; 252/63; 252/63.7; 252/188.3 R
[58] Field of Search .......................... 252/63.7, 63, 316, 64, 252/188.3 R; 174/19, 20, 17 LF, 25 C, 110 R, 110 SR; 260/33.6 UB, 77.5 CH; 264/272

[56] References Cited

U.S. PATENT DOCUMENTS

| | | | |
|---|---|---|---|
| 2,852,494 | 9/1958 | Lehmann et al. | 260/77.5 CH |
| 3,440,086 | 4/1969 | Kerns | 260/849 X |
| 3,585,278 | 6/1971 | Quirk | 174/152 |
| 3,634,050 | 1/1972 | Corino | 44/70 |
| 3,747,037 | 7/1973 | Earing | 260/33.6 UB |
| 3,748,294 | 7/1973 | Kershaw | 260/33.6 UB |
| 3,981,947 | 9/1976 | Kaufman et al. | 260/33.6 UB X |

FOREIGN PATENT DOCUMENTS

| | | |
|---|---|---|
| 1,127,082 | 4/1962 | Germany. |
| 1,168,075 | 4/1964 | Germany. |

*Primary Examiner*—Harris A. Pitlick
*Attorney, Agent, or Firm*—Cruzan Alexander; Donald M. Sell; Roger R. Tamte

[57] ABSTRACT

An electrically insulating composition especially adapted for insulating terminations or splices of oil-impregnated cables comprises an electrically insulating organic liquid and a reactive thickening agent. Initially the composition is a liquid having a low viscosity permitting it to be conveniently poured into place in a termination housing or splice casing. After reaction of the thickening agent, the composition thickens to prevent undesired drainage of the composition.

24 Claims, 1 Drawing Figure

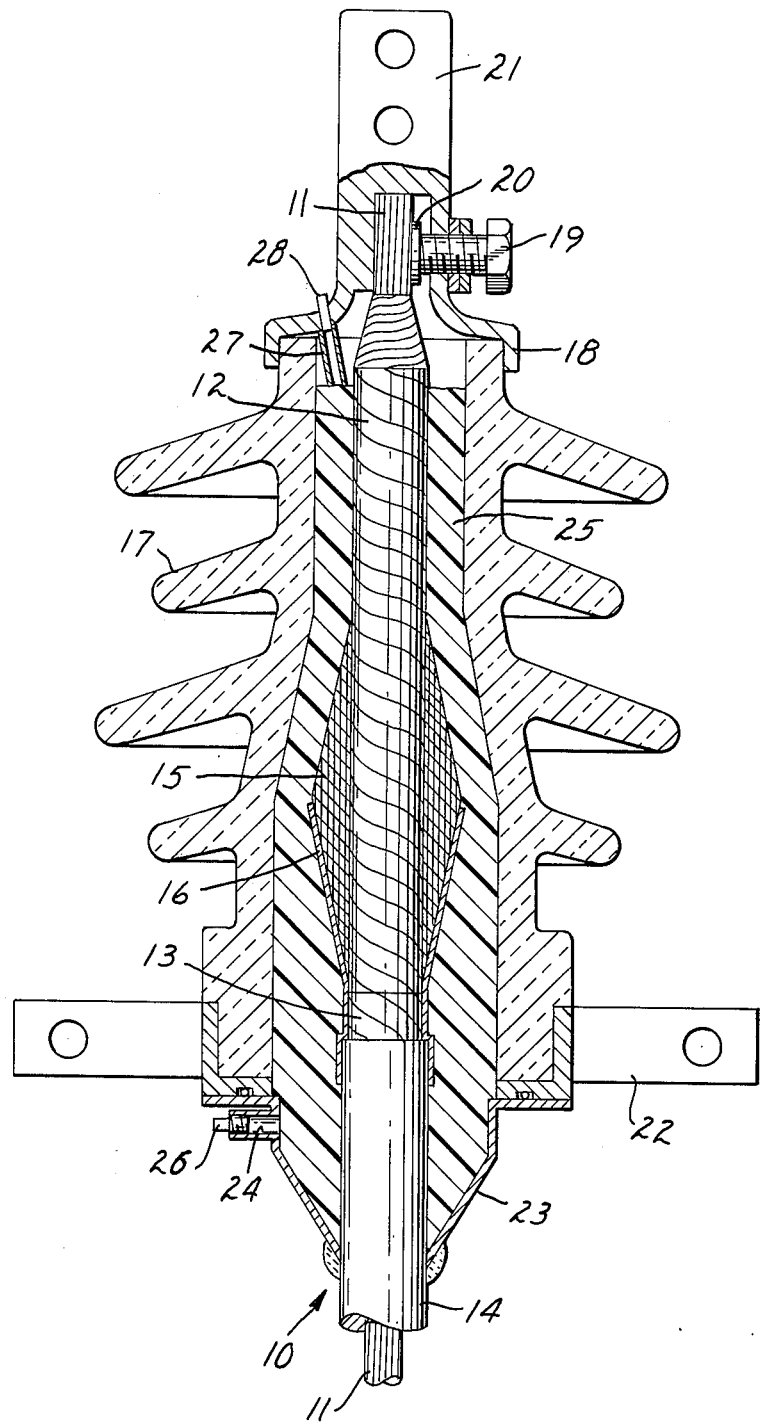

ELECTRICALLY INSULATING COMPOSITION

REFERENCE TO RELATED APPLICATION

This application is a continuation of application Ser. No. 553,982, filed Feb. 28, 1975 now abandoned.

BACKGROUND OF THE INVENTION

After cables using oil-impregnated paper as insulation have been terminated or spliced to other cables, the termination or splice area is conventionally insulated by filling it with a viscous liquid insulation. The flow properties of such an insulation permit it to serve as a reservoir, replenishing oil that drains into the cable, and taking up temperature-induced pressure changes that occur within the cable due to heating of conductors or cycling of ambient temperatures.

An important disadvantage of materials previously used as such a viscous liquid insulation, especially the commonly used highly viscous hydrocarbon-based compounds, is a requirement that they be heated to a low-viscosity condition to permit pouring them into an insulation housing, such as a termination bushing or splice casing, without entrapping air. Such heating operations, in which the compounds are heated to temperatures of 80°-150° C or more, are cumbersome and require extra equipment, fuel, and time to perform; they are hazardous to workmen, especially when the operation is performed at the top of a utility pole; and they may result in damage to adjacent equipment.

Another disadvantage with these high-viscosity compounds is that after installation they are quite stiff at normal ambient temperatures. Whenever it is desired to re-enter the termination or splice to change connections or to make a new connection, special tools must be used to strip away the insulation, and/or the compound must be heated to reduce its viscosity.

Lower-viscosity insulating materials have also been used, but they exhibit a different problem. Because of their low viscosity, they tend to drain excessively into the cable. Periodically they must be replenished, and crews regularly travel to the site of installation and repeat the pouring of insulation.

The result is that a need exists for an insulating material for terminations or splices of paper-insulated cables that will offer both a convenient installation procedure and desired properties after installation. Insofar as known, that need has never been met until the present invention.

SUMMARY OF THE INVENTION

The present invention provides a new electrically insulating composition, normally stored in two parts until the time of use, and adapted especially for use in insulating terminations or splices of oil-impregnated cables. Briefly, an insulating composition of the invention comprises 1. a dry water-immiscible nonvolatile free-flowing organic liquid that has a dielectric strength of at least 6 kilovolts per millimeter at a gap of 2.5 millimeters, a dielectric constant of no more than about 10, and a dissipation factor of no more than about 0.2, and that remains liquid at least at 0° C, and preferably lower; and 2. at least two room-temperature-reactive ingredients that are uniformly and compatibly dispersed in said organic liquid and that chemically react with one another at room temperature to form a thickening agent that is uniformly and compatibly dispersed in said organic liquid.

Prior to reaction of said ingredients, the described composition has a low room-temperature viscosity such that it may be readily poured into place without heating and without undue entrapment of air. After reaction of said ingredients, the composition has a much higher room-temperature viscosity but maintains flow properties and capability for a reduction in viscosity with an elevation in temperature. The flow properties are such that in a proper enclosure the composition can relieve pressures developing within the cable and serve as a reservoir in terminations, and yet not exhibit excessive drainage. Further, a termination or splice insulated with a composition of the invention may be conveniently re-entered without application of heat.

ANCILLARY PRIOR ART

Some prior-art references that have points of similarity to the present invention, but which did not lead to the present invention are as follows:

Quirk, U.S. Pat. No. 3,585,278 shows an electrical bushing disposed around a electrical conductor, with the insulation between the conductor and housing including a layer of cured elastomeric material which bonds the insulation to the housing. This layer comprises droplets of transformer or mineral oil dispersed in an elastomeric binder material, which may be formed by crosslinking a carboxyl-terminated polybutadiene with an epoxy resin.

The composition described in Quirk differs in composition and purpose from a composition of the invention. Quirk's composition cures with heat, and upon curing forms a bonding layer having a resilient rubbery consistency. In contrast, reaction of the thickening agent in a composition of the invention, generally at room temperature, leaves the composition in a flowable state; and upon heating the composition is reduced in viscosity and flows more.

Corino, U.S. Pat. No. 3,634,050 seeks to prevent escape of oil from damaged compartments of marine tankers or storage tanks by introducing gelling agents into the oil. The gelling agents taught in Corino are fundamentally different from those of the present invention. Upon reaction of Corino's gelling agent, a molecule of low molecular weight is formed, which apparently causes gelation by interaction with polar components (such as water) in the crude oil. In contrast, compositions of the present invention include ingredients that form a polymeric thickening agent, which thickens a dry, highly refined oil by virtue of its own extremely high viscosity. Further, there is no teaching in Corino of electrically insulating compositions; crude oil, for example, would not generally be suitable for use in commercial electrical insulation, nor would an oil that contained significant moisture.

DESCRIPTION OF THE DRAWING

The FIGURE is a sectional view through a representative single-core PILC (paper-insulated, lead-covered cable) termination using an electrically insulating composition of the invention.

The single-core cable 10 that is terminated includes a main stranded conductor 11, paper insulation 12 wrapped around the conductor, a semiconductive paper overlay 13, and an outer lead sheath 14. A conventional stress-relief wrapping 15 and stress-relief cone 16 are applied where the lead sheath 14 ends. The prepared cable 10 is placed in an enclosure that includes a porcelain housing 17, a top cap 18 which carries a bolt 19 and pad 20 for contacting the conductor 11 and a spade lug 21 for external electrical connection, a mounting bracket 22, and a wiping sleeve 23. An injection port 24 for introducing insulating composition 25 of the invention is formed in the wiping sleeve and is closed with a plug 26. An air vent tube 27 in the top cap 18 is normally closed with a plug 28.

DETAILED DESCRIPTION

The base organic liquid or oil in an insulating composition of the invention should have good electrical insulation properties, including a dielectric strength of about 150 volts per mil (6 kilovolts per millimeter) or more for 100-mil (2.5 millimeter) gaps. In addition, where an insulating composition of the invention will experience voltages up to 25 kilovolts or more, the base organic liquid should exhibit a dissipation factor of no more than about 0.2 (sometimes written as 20 percent), and a dielectric constant of no more than about 10.

Besides having good electrical properties, the base organic liquid should be free-flowing so that a composition of the invention will be easily and conveniently poured in place. Most often, the base organic liquid will have a viscosity of 5000 or less centipoises at 25° C, and preferably will have a viscosity of 2000 or less centipoises at 25° C. So that it will have the necessary flow characteristics when in place as insulation, the base organic liquid should remain liquid throughout the range of operating temperatures that the insulation will normally experience. In addition, the organic liquid should be nonvolatile, meaning that it is substantially free of volatile materials such as those used as fugitive solvents.

The base organic liquid, which is water-immiscible, is preferably compatible with oil or other liquid insulation in a cable being terminated or spliced. It should also be noncorrosive with respect to the conductor and to any metal container or housing for the insulating composition. Typically the organic liquid is also substantially inert toward (that is, not significantly reactive with) other ingredients in the composition. It should be substantially dry (generally including less than 0.05 weight-percent moisture as measured with a Karl Fische reagent, for example) to permit good electrical insulation, to assure proper stoichiometry between reactive ingredients, and to avoid formation of gas bubbles.

A wide variety of commercial liquids or oils are useful as the base organic liquid and may be blended with one another; quite often a base organic liquid used in a composition of the invention is a mixture of different compounds. Some useful organic liquids include: petroleum fractions, which are products obtained by separation and purification of crude oil and are represented by oils such as mineral oil, transformer oil, or cable-impregnating oil; synthesized oils such as alkyl benzenes; plasticizers common to the art of compounding thermoplastics, such as dioctyl phthalates or diisononyl phthalate; oils obtained from plant sources, such as pine oils or vegetable oils; and silicone oils.

The thickening agent included in a composition of the invention generally takes the form of two or more roomtemperature-coreactive ingredients that may be dispersed into the base organic liquid to produce a low-viscosity pourable liquid; generally the initial viscosity of the mixed composition is less than about 10,000 centipoises at room temperature, and preferably less than about 5000 centipoises. A composition of the invention is typically stored in two parts prior to introduction into a termination or splice, with one part of the thickening agent being present in each part of the composition. As well known in the art (see U.S. Pat. Nos. 2,932,385; 2,967,795; 2,756,875; 3,074,544; and 3,087,606), two-part splice- or termination-filling compositions may conveniently be stored until use in separate compartments of a multicompartment unitary package. The compartments are typically separated by a membrane or seam which may be ruptured to mix the separate parts of the composition immediately prior to use. The ingredients of the thickening agent exhibit compatibility with the base organic liquid both prior to and after their reaction (meaning that when either the unreacted ingredients or reacted ingredients are dispersed in the base organic liquid, the mixture does not separate upon standing into distinct layered phases). In effect, the base organic liquid generally serves as a solvent or plasticizer for the ingredients of the thickening agent as well as the reacted thickening agent.

The ingredients of the thickening agent should react to thicken the composition but to leave it as a flowable liquid or semisolid (which will assume the shape of its container, for example). In addition, the composition should be reduced in viscosity upon heating; in general, the composition will vary at least 10,000 centipoises and preferably at least 25,000 centipoises in the temperature interval 25° C to 100° C. To obtain this result the coreactive groups on the ingredients generally average no more than about 3 per molecule. On the other hand, to assure the necessary increase in viscosity upon in situ reaction of the ingredients of the thickening agent there should be at least one coreactive group per molecule of the ingredients. Where the needed increase in viscosity is achieved by polymerization (as contrasted to reaction between preformed large molecules), there are on the average at least about 1.5 coreactive groups per molecule; that is almost always the case. Preferably there are between about 1.8 and 2.3, and most often slightly more than 2, coreactive groups per molecule of the ingredients.

It is preferable for at least one of the ingredients of the thickening agent to be in a prepolymerized form, since use of an ingredient in that form contributes to good uniformity of molecular weight in the reacted thickening agent.

Thickening agents based on a reactive ingredient that carries isocyanate groups are presently preferred because such ingredients permit good control on reaction of the thickening agent. They may typically be obtained with rather uniform difunctionality, and during in situ reaction, a high proportion of chain-extension is obtained instead of cross-linking. Useful isocyanate-terminated ingredients include toluene diisocyanate, methylene bis(phenylisocyanate) or liquefied versions thereof, isocyanate-terminated dimerized fatty acids, and isophorone diisocyanate.

Polyols are often preferred for use with the isocyanate-terminated ingredients since they provide good electrical properties when reacted with the isocyanate-terminated ingredients. Useful polyols include hydroxyl-terminated polybutadiene, hydroxyl-terminated polypropylene oxide, and N,N-bis(2-hydroxypropyl)-aniline. However, amine-terminated ingredients may also be used with the isocyanate-terminated ingredient. An example of a useful amine is a secondary aromatic diamine such as N,N'-dibutyl-p-phenylene diamine.

The reactive ingredients of the thickening agent are added to the base organic liquid in an amount that will generally cause the room-temperature viscosity of the overall composition after reaction of the ingredients to be at least 50,000 centipoises, and preferably at least 75,000 centipoises. The useful proportion of reactive ingredients will vary widely depending on the viscosity of the base organic liquid and of the reacted thickening agent, but the reactive ingredients will almost always constitute less than about 50 weight-percent of the total composition, more often less than 35 weight-percent, and most often less than 25 weight-percent. To achieve the desired increase in viscosity upon in situ reaction of the thickening agent, a composition should generally include at least 5 weight-percent of reactive ingredients of the thickening agent, and more often at least 7 or 8 weight-percent. Where the reactive ingredients are based on urethane or urea chemistry, the reactive ingredients usually are included in an approximately stoichiometric ratio, that is, a ratio of about 0.6 to 1.3, and preferably in a ratio 0.7 to 1.1.

The reacted thickening agent as well as the base organic liquid should be thermally stable, that is, should not become dissociated or degraded to lower-viscosity forms in the presence of temperatures experienced when the composition is in place as insulation in the termination or splice. Normally, the insulation will not experience temperatures outside the range of −40° C to 90° C, though for short intervals temperatures up to 130° C may be experienced.

Catalysts may be included in the composition to increase the rate of reaction of the reactive ingredients of the thickening agent. For example, as to thickening agents that comprise isocyanate- and hydroxyl-terminated ingredients, catalysts such as phenyl mercuric acetate, triethylenediamine and iron bis-acetonylacetonate may be used. Other additives that may be included are antioxidants or stabilizers, which may be useful, for example, to prevent premature reaction of isocyanate groups on a prepolymer with urethane groups in the prepolymer.

The invention will be further illustrated by the following examples. (The compounding procedure for the examples generally included separately mixing the ingredients of a first part, labelled Part A, except for a catalyst, and the ingredients of a second part, Part B, except for an isocyanate-terminated ingredient, and then drying the separate mixtures by heating them in a vacuum. After the mixtures had cooled somewhat, the catalyst was added to the Part A mixture and the isocyanate-terminated ingredient was added to the Part B mixture. In Examples 1, 2 and 5 the Part B mixture was then heated, whereupon the isocyanate- and hydroxyl-terminated ingredients reacted to form a prepolymer.)

EXAMPLE 1

In insulating composition was prepared in two parts, as described below:

| Part A | Parts by Weight |
|---|---|
| N,N-bis(2-hydroxypropyl)-aniline (Isonol C-100, made by Upjohn) | 2.5 |
| Low-molecular-weight polystyrene (Piccolastic A-5 made by Hercules) | 48.6 |
| Aromatic petroleum fraction (Calumet 66 made by Calumet Refining Company) | 48.6 |
| phenyl Mercuric acetate (catalyst) | 0.3 |

| Part B | Parts by Weight |
|---|---|
| Liquid methylene bis(phenylisocyanate) (Isonate 143L made by Upjohn) | 5.08 |
| Hydroxyl-terminated polybutadiene (Hystil G-2000 made by Dynachem Corp.) | 12.42 |
| Low-molecular-weight polystyrene (Piccolastic A-5) | 40.75 |
| Aromatic petroleum fraction (Calumet 66) | 40.75 |
| (3,5-di-t-butyl-4-hydroxyphenyl)propionate (antioxidant; Irganox 1076 made by Ciba-Geigy) | 1.00 |

When these two parts were mixed in equal weight amounts, the composition cured in about 24 hours to give a viscous, flowable solution. The composition had a viscosity approaching 100,000 centipoises at 25° C and a viscosity of about 100 centipoises at 100° C. The reactive ingredients constituted 10 weight-percent of the composition; compositions including the ingredients of this example in which the proportion of reactive ingredients varied from about 8 to 15 weight-percent had generally the same viscosity characteristic as described, which is rather close to the presently desired viscosity characteristic exhibited by a popular hot-pour insulating composition. The equivalent ratio of isocyanate to hydroxyl varied from 0.9 and 1.1 in these compositions.

This composition was tested for electrical properties, thermal stability, and high voltage properties:

| | ELECTRICAL PROPERTIES | | |
|---|---|---|---|
| A: | Temperatures (° C) | Dielectric Constant (100 Hz) | Dissipation Factor |
| | 23 | 2.92 | 0.006 |
| | 61 | 2.83 | 0.024 |
| | 90 | 2.80 | 0.1 |
| | 110 | 2.80 | 0.2 |
| B: | Dielectric Strength (50-mil (1,25-millimeter) gap) | | 1220 volts/mil (48.8 kilovolts/ millimeter) |

THERMAL STABILITY

No significant change in viscosity of the composition was noted after 6 weeks at 75° C in a closed container, illustrating the excellent thermal stability of the composition.

| Time | Viscosity (centipoises at 72° C) |
|---|---|
| 1 week | 280 |
| 2.5 weeks | 250 |
| 6 weeks | 235 |

HIGH-VOLTAGE TESTING

The composition was mixed and injected or poured into suitable mold bodies and bushings to serve as an insulating filler and successfully passed all of the following tests.

1. Tests prescribed by AIEE Standard No. 48 for potheads adapted for 20-kilovolt-rated terminations.
2. Tests prescribed by Italian Standards CEI No. 20-24 for cable accessories for PILC (paper-insulated lead-covered cable):
   a. Single-core terminations for 20-kilovolt PILC
   b. Three-core terminations for 20-kilovolt PILC
   c. Three-core terminations for 15-kilovolt PILC d. Transition splice for 15-kilovolt PILC to polymeric insulated cable.

In addition, a termination (trifurcation) on three-conductor 15-kilovolt-rated PILC, insulated with the composition of this example was subjected to thermal cycling (one hour of current heating to a conductor temperature of 75° to 80° C followed by 7 hours of cooling to ambient temperature with no current) while under a 27-kilovolt phase-to-phase potential. This test ran continuously for 1500 hours without failure, at which point the test was ended.

Terminations were also applied to dry (no cable oil) PILC and filled with the above compound. A slow drop in the level of the composition in the termination indicated that the reacted composition is able to wet and migrate into the paper to replace cable oil.

No electrical breakdown or leakage of insulating composition was noted in any of the terminations or splices under test.

EXAMPLE 2

An electrically insulating composition was prepared in two parts, described below:

| Part A | Parts by Weight |
| --- | --- |
| Hydroxyl-terminated polybutadiene (Poly BD-45M, made by ARCO) | 11.24 |
| Dodecylbenzene (Alkylate 21 made by Chevron) | 88.6 |
| (3,5,di-t-butyl-4-hydroxyphenyl) propionate antioxidant (Irganox 1076) | 0.2 |
| Phenyl mercuric oleate (catalyst) | 1.0 |
| Part B | Parts by Weight |
| Hydroxyl-terminated polybutadiene (Poly BD-45 M) | 3.10 |
| Benzoyl chloride (stabilizer) | 0.001 |
| Liquid methylene bis(phenyl isocyanate) (Isonate 143L) | 1.06 |
| Dodecylbenzene (Alkylate 21) | 96.24 |

When these two parts were mixed in equal weight amounts, the composition cured in about 24 hours at 25° C to a loose gel-like material.

The composition was then used as an insulating filler in a termination of 27-kilovolt-rated PILC single-conductor cable and subjected to the following tests:

1. A one-minute 60-Hz withstand at 70 kilovolts.
2. Ten impulse surges (1.5 × 40 microsecond wave) of ± 170 kilovolts.
3. A four-hour 60-Hz withstand at 76 kilovolts.

The composition described in the listed formulation included 7 weight-percent of reactive ingredients and the isocyanate/hydroxyl ratio was 0.7. Compositions including the same ingredients and having close similarity to the desired viscosity characteristic as previously described in Example 1 were prepared by varying the amount of reactive ingredients from 6 to 10 weight-percent and the isocyanate/hydroxyl equivalent ratio between 0.65 and 1.1.

EXAMPLE 3

An insulating composition was prepared in two parts, described as follows:

| Part A | Parts by Weight |
| --- | --- |
| Hydroxyl-terminated polypropylene oxide having a molecular weight of about 2000 (Niax 2025 made by Union Carbide) | 27.09 |
| Irganox 1076 (antioxidant) | 0.31 |
| Phenyl mercuric acetate (catalyst) | 0.06 |
| Alkyl benzene mixture (Alkylate 51 made by Chevron) | 25.41 |
| Low-molecular weight polystyrene (Piccolastic A-5) | 47.50 |
| Part B | Parts by Weight |
| Liquid methylene bis(phenyl isocyanate) (Isonate 143L) | 3.91 |
| Alkyl benzene mixture (Alkylate 51) | 33.59 |
| Low-molecular-weight polystyrene (Piccolastic A-5) | 62.50 |

When these parts were mixed in equal weight amounts they reacted in about 24 hours at 25° C to give a viscous flowable solution. This composition had a viscosity of about 100,000 centipoises at 25° C and a viscosity of about 600 centipoises at 100° C. The described composition included about 15.5 weight-percent reactive ingredients; compositions having 10 to 20 weight-percent of reactive ingredients exhibited the similarity to desired temperature-viscosity characteristics previously mentioned in Example 1. Those compositions also varied in isocyanate-hydroxyl equivalent ratios between 0.8 and 1.1.

EXAMPLE 4

An insulating composition was prepared in two parts, described as follows:

| Part A | Parts by Weight |
| --- | --- |
| N,N'-dibutyl-p-phenylene diamine (Tenamine-2 made by Eastman) | 17.36 |
| Low molecular-weight polystyrene | 41.32 |
| Aromatic petroleum fraction (Calumet 66) | 41.32 |
| Part B | Parts by Weight |
| Liquid methylene bis(phenyl-isocyanate) (Isonate 143L) | 22.64 |
| Low-molecular-weight polystyrene | 38.68 |
| Aromatic petroleum fraction (Calumet 66) | 38.68 |

When these two parts were mixed in equal weights, they cured in about 12 hours to a viscous, flowable solution. At 25° C the composition had a dielectric constant (100 Hz) of 4.15 and a dissipation factor of 0.056. The composition exhibited a viscosity at 25° C somewhat over 100,000 centipoises and at 100° C exhibited a viscosity somewhat less than 100 centipoises. After one week at 75° C the viscosity of the solution increased slightly (from about 120 to 200 centipoises, measured at 75° C) indicating that no thermal degradation of the polymer solution had occurred. Compositions of this example containing 15–25 weight-percent reactive ingredients and isocyanate-amine equivalent ratios of 0.9 to 1.1 exhibited close similarity to the desired viscosity characteristics as previously mentioned in Example 1.

EXAMPLE 5

An insulating composition was prepared in two parts, described as follows:

| Part A |
| --- |

-continued

| | Parts by Weight |
|---|---|
| N,N'-dibutyl-p-phenylene diamine (Tenamine-2) | 5.4 |
| Aromatic petroleum fraction (Calumet 66) | 47.3 |
| Low-molecular-weight polystyrene (Piccolastic A-5) | 47.3 |
| Part B | |
| | Parts by Weight |
| Liquid methylene bis(phenyl isocyanate) (Isonate 143L) | 9.8 |
| Hydroxyl-terminated polybutadiene (Hystil G-2000) | 24.8 |
| Aromatic petroleum fraction (Calumet 66) | 32.7 |
| Low-molecular-weight polystyrene (Piccolastic A-5) | 32.7 |

When these two parts were mixed in equal parts, the mixture cured in about 12 hours to a viscous, flowable liquid. At 25° C and 100 Hz the solution exhibited a dielectric constant of 4.12 and a dissipation factor of 0.025.

EXAMPLE 6

An insulation composition was prepared in two parts, described as follows:

| Part A | |
|---|---|
| | Parts by Weight |
| Hydroxyl-terminated polybutadiene (Hystil G-2000) | 47.80 |
| Aliphatic petroleum fraction (Shellflex 371 made by Shell) | 49.24 |
| Iron bis-acetonylacetonate (catalyst) | 1.97 |
| Triethylenediamine (catalyst; DABCO supplied by Air Products) | 0.99 |
| Part B | |
| | Parts by Weight |
| Diisocyanate-terminated dimerized fatty acid (DDI-1410 supplied by General Mills) | 11.31 |
| Aliphatic petroleum fraction (Shellflex 371) | 88.69 |

When these two parts were mixed in equal weight amounts, the composition cured in about 8 hours to a viscous, flowable liquid exhibiting a viscosity of 65,000 centipoises at 22° C and a viscosity of about 600 centipoises at 100° C. This composition included 30 weight-percent of reactive ingredients. Its electrical properties were as follows:

ELECTRICAL PROPERTIES

| A: | Temperatures (° C) | Dielectric Constant (100 Hz) | Dissipation Factor |
|---|---|---|---|
| | 23 | 2.46 | 0.0003 |
| | 60 | 2.31 | 0.018 |
| | 90 | 2.34 | 0.017 |
| | 120 | 2.34 | 0.0063 |
| B: | Dielectric Strength (50-mil (1.25 millimeter) gap) | | 520 volts/mil 20.8 kilovolts/ millimeter |

What is claimed is:

1. A two-part composition disposed in a single unitary package with the parts of the composition stored in separate compartments within the package and adapted upon mixing for use in electrical insulation of oil-impregnated cables, the composition comprising (1) a dry water-immiscible nonvolatile free-flowing organic liquid that has a dielectric strength of at least 6 kilovolts per millimeter at a gap of 2.5 millimeters, a dielectric constant of no more than about 10, and a dissipation factor of no more than about 0.2, and that remains liquid at least 0° C; and (2) at least two room-temperature-reactive ingredients separated from one another in said parts of the composition and adapted, upon mixing of the parts, to be uniformly and compatibly dispersed in said organic liquid and to chemically react with one another at room temperature to form a thermally stable high-viscosity thickening agent that is uniformly and compatibly dispersed in said organic liquid, the coreactive groups of said ingredients averaging between about 1.8 and 2.3 per molecule; said composition after mixing of said parts, but prior to reaction of said ingredients having a room-temperature viscosity of less than about 10,000 centipoises; and said composition, after reaction of said ingredients, (a) being flowable so as to assume the shape of its container, (b) having a room-temperature viscosity of at least 50,000 centipoises, and (c) having a variation in viscosity in the temperature interval 25° C to 100° C of at least 10,000 centipoises.

2. A composition of claim 1 in which the reactive groups of one of said reactive ingredients comprise isocyanate groups.

3. A composition of claim 2 in which the reactive groups of the other of said reactive ingredients comprise hydroxyl groups.

4. A composition of claim 2 in which the reactive groups on the other of said reactive ingredients comprise amine groups.

5. A composition of claim 1 in which said reactive ingredients comprise less than about 50 weight-percent of the composition.

6. A composition of claim 1 in which at least one of said ingredients is a prepolymer.

7. A two-part composition disposed in a single unitary package with the parts of the composition stored in separate compartments within the package and adapted upon mixing for use in electrical insulation of oil-impregnated cables, the composition comprising (1) a dry water-immiscible nonvolatile free-flowing organic liquid that has a dielectric strength of at least 6 kilovolts per millimeter when tested at a gap of 2.5 millimeters, a dielectric constant of no more than about 10, and a dissipation factor of no more than about 0.2, and that remains liquid at least at 0° C; and (2) at least two room-temperature-reactive ingredients separated from one another in said parts of the composition, one of said ingredients having isocyanate terminal groups and the other having hydroxyl terminal groups, said ingredients comprising no more than about 35 weight-percent of said composition and being adapted, upon mixing of the parts of the composition, to be uniformly and compatibly dispersed in said organic liquid, and chemically reacting with one another to form a high-viscosity thickening agent that is uniformly and compatibly dispersed in said organic liquid; the isocyanate and hydroxyl coreactive groups of said ingredients averaging between about 1.8 and 2.3 per molecule; said composition after mixing of said parts but prior to reaction of said ingredients, having a room-temperature viscosity of less than about 10,000 centipoises; and said composition, after reaction of said ingredients, (a) being flowable so as to assume the shape of its container, (b) having a room-temperature viscosity of at least 50,000 centipoises, and (c) having a variation in viscosity in the temperature interval 25° C to 100° C of at least 10,000 centipoises.

8. A composition of claim 7 in which said organic liquid comprises one or more petroleum fractions.

9. A composition of claim 7 in which at least one of said reactive ingredients is a prepolymer.

10. A method for electrically insulating a section of power transmission line comprising A. placing a housing capable of holding a liquid electrically insulating composition around a base conductor that is to be insulated; and B. introducing into the housing a composition that comprises (1) a dry water-immiscible nonvolatile free-flowing organic liquid that has a dielectric strength of at least 6 kilovolts per millimeter at a gap of 2.5 millimeters, a dielectric constant of no more than about 10, and a dissipation factor of no more than about 0.2, and that remains liquid at at least 0° C; and (2) at least two room-temperature-reactive ingredients that are uniformly and compatibly dispersed in said organic liquid and that chemically react with one another at room temperature to form a thermally stable high-viscosity thickening agent that is uniformly and compatibly dispersed in said organic liquid, the coreactive groups of said ingredients averaging between about 1.8 and 2.3 per molecule; said composition prior to reaction of said ingredients having a room-temperature viscosity of less than 5000 centipoises, and after reaction of said ingredients, (a) being flowable so as to assume the shape of its container, (b) having a room-temperature viscosity of at least 50,000 centipoises, and (c) having a variation in viscosity in the temperature interval 25° C to 100° C of at least 10,000 centipoises.

11. A method of claim 10 in which the reactive groups on one of said reactive ingredients comprise isocyanate groups.

12. A method of claim 11 in which the reactive groups on the other of said reactive ingredients comprise hydroxyl groups.

13. A method of claim 11 in which the reactive groups on the other of said ingredients comprise amine groups.

14. A method of claim 10 in which said reactive ingredients comprise less than about 50 weight-percent of the composition.

15. A method of claim 10 in which at least one of said reactive ingredients is a prepolymer.

16. A composition adapted for use in electrical insulation of oil-impregnated cables and prepared by mixing (1) a dry water-immiscible nonvolatile free-flowing organic liquid that has a dielectric strength of at least 6 kilovolts per millimeter at a gap of 2.5 millimeters, a dielectric constant of no more than about 10, and dissipation factor of no more than about 0.2, and that remains liquid at least at 0° C; and (2) at least two room-temperature-reactive ingredients so that said ingredients are uniformly and compatibly dispersed in said organic liquid, the ingredients chemically reacting with one another at room temperature to form a thermally stable high-viscosity thickening agent that is uniformly and compatibly dispersed in said organic liquid, the coreactive groups of said ingredients averaging between about 1.8 and 2.3 per molecule; said composition prior to reaction of said ingredients having a room-temperature viscosity of less than about 10,000 centipoises; and said composition, after reaction of said ingredients, (a) being flowable so as to assume the shape of its container, (b) having a room-temperature viscosity of at least 50,000 centipoises, and (c) having a variation in viscosity in the temperature interval 25° C to 100° C of at least 10,000 centipoises.

17. A composition of claim 16 in which the reactive groups of one of said reactive ingredients comprise isocyanate groups.

18. A composition of claim 17 in which the reactive groups on the other of said reactive ingredients comprise hydroxyl groups.

19. A composition of claim 17 in which the reactive groups on the other of said reactive ingredients comprise amine groups.

20. A composition of claim 16 in which said reactive ingredients comprise less than about 50 weight-percent of the composition.

21. A composition of claim 16 in which at least one of said ingredients is a prepolymer.

22. A composition adapted for use in electrical insulation of oil-impregnated cables and prepared by mixing (1) a dry water-immiscible nonvolatile free-flowing organic liquid that has a dielectric strength of at least 6 kilovolts per millimeter when tested at a gap of 2.5 millimeters, a dielectric constant of no more than about 10, and a dissipation factor of no more than about 0.2, and that remains liquid at least at 0° C; and (2) at least two room-temperature-reactive ingredients so that the ingredients are uniformly and compatibly dispersed in said organic liquid and comprise no more than about 35 weight-percent of said composition; one of the ingredients having isocyanate terminal groups and the other having hydroxyl terminal groups and the ingredients chemically reacting with one another to form a high-viscosity thickening agent that is uniformly and compatibly dispersed in said organic liquid; the isocyanate and hydroxyl coreactive groups of said ingredients averaging between about 1.8 and 2.3 per molecule; said composition prior to reaction of said ingredients, having a room-temperature viscosity of less than about 10,000 centipoises; and said composition, after reaction of said ingredients, (a) being flowable so as to assume the shape of its container, (b) having a room-temperature viscosity of at least 50,000 centipoises, and (c) having a variation in viscosity in the temperature interval 25° C to 100° C of at least 10,000 centipoises.

23. A composition of claim 22 in which said organic liquid comprises one or more petroleum fractions.

24. A composition of claim 22 in which at least one of said reactive ingredients is a prepolymer.

* * * * *